United States Patent
Chen et al.

(10) Patent No.: US 8,655,620 B2
(45) Date of Patent: Feb. 18, 2014

(54) METHOD AND MODULE FOR MEASURING ROTATION AND PORTABLE APPARATUS COMPRISING THE MODULE

(75) Inventors: Chung-Tso Chen, Hsinchu (TW); Chung-Ta King, Hsinchu (TW); Chun-Yu Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 379 days.

(21) Appl. No.: 13/076,101

(22) Filed: Mar. 30, 2011

(65) Prior Publication Data

US 2012/0173189 A1 Jul. 5, 2012

(30) Foreign Application Priority Data

Dec. 29, 2010 (TW) ................................ 99146516 A

(51) Int. Cl.
*G06F 15/00* (2006.01)
*H04N 7/00* (2011.01)

(52) U.S. Cl.
USPC ............................................ 702/141; 348/37

(58) Field of Classification Search
USPC ......................................................... 702/141
See application file for complete search history.

(56) References Cited

U.S. PATENT DOCUMENTS

| | | | | |
|---|---|---|---|---|
| 7,774,155 | B2 * | 8/2010 | Sato et al. | 702/127 |
| 2011/0163950 | A1 * | 7/2011 | Ye et al. | 345/157 |
| 2011/0234750 | A1 * | 9/2011 | Lai et al. | 348/37 |

* cited by examiner

*Primary Examiner* — Bryan Bui
(74) *Attorney, Agent, or Firm* — Birch, Stewart, Kolasch & Birch, LLP

(57) ABSTRACT

The invention discloses a method and a module for measuring rotation and a portable apparatus comprising said module. The module of the present invention is adapted for measuring rotation of a target, and the module includes a first sensor, a second sensor and a processor. The first sensor is disposed at a first location of the target, for sensing a first centripetal acceleration and a first tangential acceleration when the target is rotated. The second sensor is disposed at a second location of the target, for sensing a second centripetal acceleration and a second tangential acceleration when the target is rotated. The processor is coupled to the first sensor and the second sensor, for receiving the first centripetal acceleration and the first tangential acceleration from the first sensor, receiving the second centripetal acceleration and the second tangential acceleration from the second sensor, and calculating the rotation angle of the target accordingly.

12 Claims, 5 Drawing Sheets

METHOD AND MODULE FOR MEASURING ROTATION AND PORTABLE APPARATUS COMPRISING THE MODULE

FIELD OF THE INVENTION

The present invention relates to a method and module for measuring rotation and portable apparatus comprising of the module, and it specifically relates a method and module for measuring rotation using only three axes accelerometer and portable apparatus comprising of the module.

BACKGROUND OF THE INVENTION

Portable electronic devices, for example, mobile phone, notebook computer, tablet computer, personal digital assistant and media player, have more and more functions, and the users have more dependence on portable electronic device, that is, lots of daily work or job related behavior have to rely on the assistance from portable electronic device. For example, for current mobile phone, in addition to calling and message sending function, usually one or several functions are integrated, for example, photography, positioning, navigation, internet surfing and game, etc.

In order to reach the above mentioned functions and to satisfy the demand of the users, currently, there are lots of portable electronic devices in the market integrating with all kinds of functional devices or modules. For example, in order to possess photography function, lens module is integrated; in order to possess positioning or navigation function, GPS positioning module is integrated; in order to have internet surfing function, wireless network module is integrated; in order to have game playing function, touch sensor and three axes accelerometer, etc. are integrated.

Wherein, three axes accelerometer can detect the acceleration on three axes (that is, X, Y and Z axes) of portable electronic device, then the user's action is reflected to perform corresponding control, for example, the turning and velocity change of the target under control in the game.

In the traditional three axes accelerometer, it is used to detect the included angle change between acceleration and gravitational acceleration of object (for example, the above mentioned portable electronic device), then the tilting angle generated while the object rotates can be calculated, and corresponding control can then be performed. However, when the rotation is not related to gravitational force (for example, the rotation in the horizontal direction), a single three axes accelerometer will be unable to measure the rotational angle change, which might lead to inconvenience to the user.

In order to solve this issue, in addition to three axes accelerometer, the designer or the manufacturer even integrates extra component, for example, gyroscope or digital compass to detect the horizontal rotation of the portable electronic device. However, the integration of these extra components will increase the volume, manufacturing cost and calculation complexity of the portable electronic device.

SUMMARY OF THE INVENTION

Therefore, the scope of this invention is to provide a method and module for measuring rotation and portable device comprising the module so as to solve the prior art issue.

According to one preferred embodiment, the rotation measuring module of this invention can measure the rotation of the target object, and the rotation measuring module comprising of first sensor, second sensor and processor.

A first sensor is installed at the first location of the target object so as to sense the first centripetal acceleration and the first tangential acceleration while the target object is rotating. A second sensor is installed at the second location of the target object so as to sense the second centrifugal acceleration and the second tangential acceleration while the target object is rotating.

In addition, the process is connected respectively to the first sensor and the second sensor. The process can receive the first centripetal acceleration ($a_C$) and the first tangential acceleration ($a_T$) from the first sensor and receive the second centrifugal acceleration and the second tangential acceleration from the second sensor. Processor further follows the following equation 1 and 2 to calculate angular velocity ($\omega$) and angular acceleration ($\alpha$) of the first location and the second location:

$$\omega = \sqrt{\frac{a_C}{r}} \qquad \text{[Equation 1]}$$

$$\alpha = \frac{a_T}{r} \qquad \text{[Equation 2]}$$

Wherein, r is the distance of first location and second location respectively to the rotational center of the target object.

Then the processor will follow the following equation 3 to calculate the rotational angle ($\Delta\theta$) of the target object:

$$\Delta\theta = \omega \cdot \Delta t + \frac{1}{2}\alpha \cdot \Delta t^2 \qquad \text{[Equation 3]}$$

Wherein $\Delta t$ is the sampling period of first sensor and second sensor during the measurement.

According to another preferred embodiment, the rotation measuring method of this invention is applicable to the measurement of the rotation of the target object, which includes the following steps: (a) During the rotation of the target object, the first centripetal acceleration and the first tangential acceleration is measured at the first location of the target object, and at the second location of the target object, second centrifugal acceleration and second tangential acceleration is measured; (b) First centripetal acceleration ($a_C$) and first tangential acceleration ($a_T$) is received respectively, and second centrifugal acceleration and second tangential acceleration is measured respectively too; according to the above equation 1 and 2, the angular velocity ($\omega$) and angular acceleration ($\alpha$) of first location and second location are calculated respectively; and (d) According to the above equation 3, the rotational angle ($\Delta\theta$) of the target object is calculated.

According to further one preferred embodiment, portable device of this invention includes rotation measuring module as mentioned above to measure the rotation of the portable device.

Since this invention uses two sensors to measure respectively the centrifugal acceleration and tangential acceleration at different locations of the target object, hence, it can measure the horizontal rotation of target object. In addition, data measured by two sensors, depending on the real situation, can be mutually compensated, and the error can be correspondingly reduced. In addition, this invention, through two sensors, can measure the horizontal rotation of the target object, hence, it can be integrated into the portable device, and it will have advantages such as small volume, low cost and low computational complexity, etc. as compared to the prior art technology.

For the advantages and spirit regarding the present invention, further understanding can be achieved through the following detailed description and attached drawings of the present invention.

DETAILED DESCRIPTION OF THE INVENTION

This invention provides a method and module for measuring rotation and a portable device comprising of the module. In the following, through the detailed description of preferred embodiment and actual application case of this invention, the feature, spirit and advantages of this invention are fully described.

Please note that the "portable device" as described in this invention can be, but not limited to, for example, mobile phone, personal digital assistant, smart mobile phone, multimedia player, game box, monitor, electronic watch, measurement device, and other suitable portable electronic device.

Figure 1A:
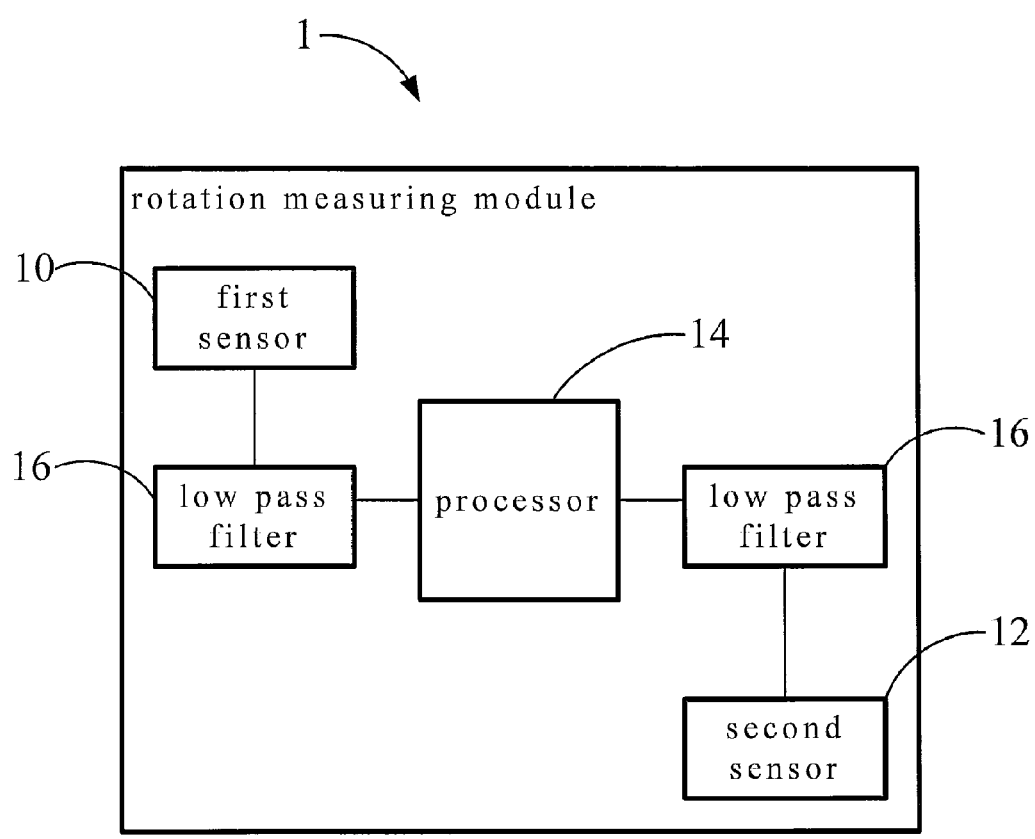
FIG. 1A illustrates the functional block diagram of rotation measuring module of one preferred embodiment according to this invention.
Figure 1B:
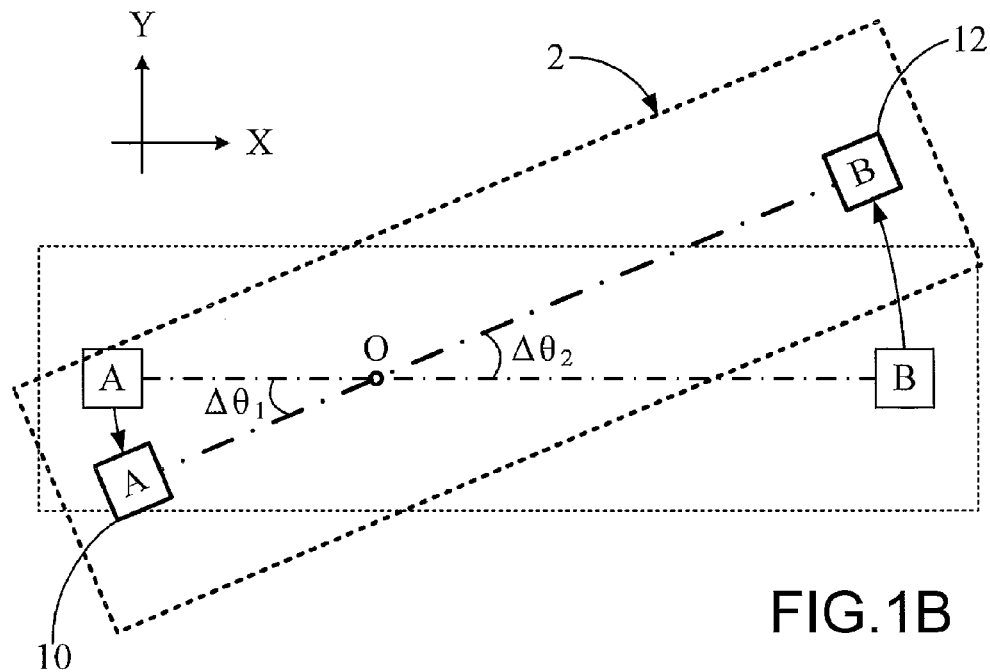
FIG. 1B illustrates the measurement using the rotation measuring module.
Figure 1C:
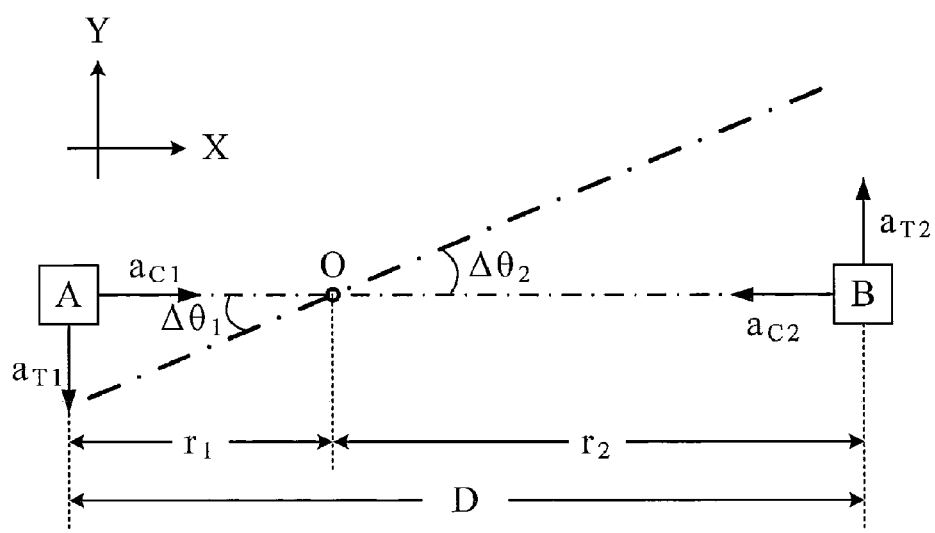
FIG. 1C illustrates the sensing of rotation measuring module of this invention while target object is rotating.
Figure 2:
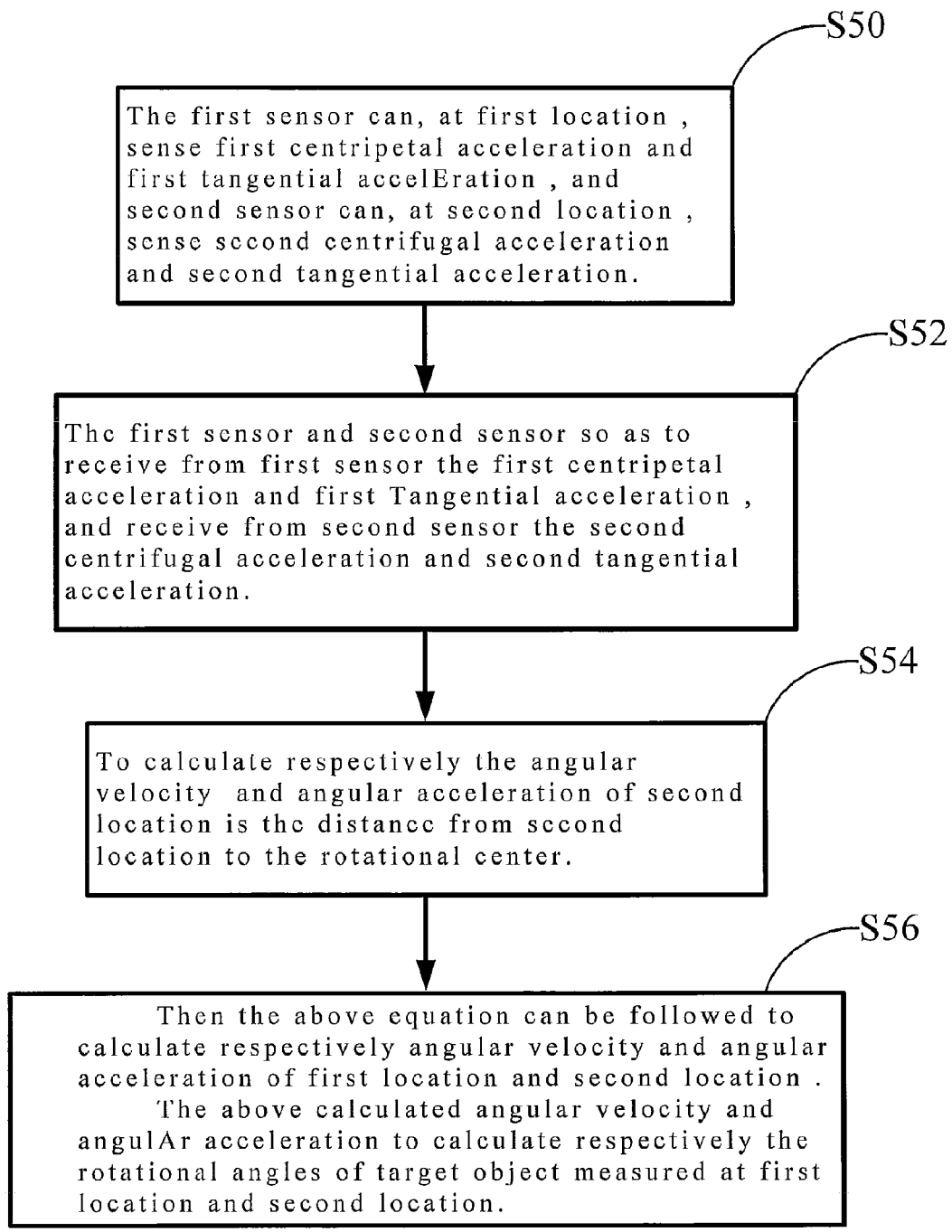
FIG. 2 illustrates the block diagram of rotation measuring method of one preferred embodiment of this invention.

Please refer together to FIGS. 1A, 1B, 1C and 2. In FIG. 1A, it illustrates the functional block diagram of rotation measuring module according to one preferred embodiment of this invention; FIG. 1B illustrates the measurement of the rotation measuring module; FIG. 1C illustrates the sensing of the rotation measuring module while the target object is rotating; FIG. 2, illustrates the flow chart of rotation measuring method according to one preferred embodiment of this invention.

As shown in FIGS. 1A and 1B, the rotation measuring module 1 of this preferred embodiment includes first sensor 10, second sensor 12 and processor 14. First sensor 10 is installed at the first location A of target object 2, and second sensor 12 is installed at the second location B of target object 2. First sensor and second sensor can be three axes accelerometer, but is not limited to this.

When target object 2 rotates, first sensor 10 can, at first location A, sense first centripetal acceleration ($a_{C1}$) and first tangential acceleration ($a_{T1}$), and second sensor 12 can, at second location B, sense second centrifugal acceleration ($a_{C2}$) and second tangential acceleration ($a_{T2}$) (Step S50).

Process 14 is connected respectively to first sensor and second sensor 12 so as to receive from first sensor 10 the first centripetal acceleration ($a_{C1}$) and first tangential acceleration ($a_{T1}$), and receive from second sensor 12 the second centrifugal acceleration ($a_{C2}$) and second tangential acceleration ($a_{T2}$) (Step S52). Process 14 further follows the following equation 1-1 and 2-1 respectively to calculate angular velocity ($\omega_1$) and angular acceleration ($\alpha_1$) of first location A:

$$\omega_1 = \sqrt{\frac{a_{C1}}{r_1}} \qquad \text{[Equation 1-1]}$$

$$\alpha_1 = \frac{a_{T1}}{r_1} \qquad \text{[Equation 2-1]}$$

Wherein, $r_1$ is the distance from first location A to the rotational center O of target object.

In the mean time, processor 14 also follows the following equation 1-2 and 2-2 to calculate respectively the angular velocity ($\omega_2$) and angular acceleration ($\alpha_2$) of second location B:

$$\omega_2 = \sqrt{\frac{a_{C2}}{r_2}} \qquad \text{[Equation 1-2]}$$

$$\alpha_2 = \frac{a_{T2}}{r_2} \qquad \text{[Equation 2-2]}$$

Wherein, $r_2$ is the distance from second location B to the rotational center O of target object (Step S54).

In real application, when $r_1$ and $r_2$ is the known given value (For example, when target object 2 has single rotation center, such as support point), then the above equation can be followed to calculate respectively angular velocity ($\omega_1$, $\omega_2$) and angular acceleration ($\alpha_1$, $\alpha_2$) of first location A and second location B. When $r_1$ and $r_2$ is unknown, processor 14 will follow the following equation 3-1 and 3-2 to calculate respectively $r_1$ and $r_2$.

$$r_1 = \frac{D \cdot a_{T1}}{a_{T1} + a_{T2}} \qquad \text{[Equation 3-1]}$$

$$r_2 = \frac{D \cdot a_{T2}}{a_{T1} + a_{T2}} \qquad \text{[Equation 3-2]}$$

Wherein D is the distance between the first location A and the second location B. Through this, processor 14 can also calculate the location of rotational center O on target object 2.

Next, processor 14 can follow respectively the following equations 4-1, 4-2 and the above calculated angular velocity ($\omega_1$, $\omega_2$) and angular acceleration ($\alpha_1$, $\alpha_2$) to calculate respectively the rotational angles ($\Delta\theta_1$, $\Delta\theta_2$) of target object 2 measured at first location A and second location B:

$$\Delta\theta_1 = \omega_1 \cdot \Delta t + \frac{1}{2}\alpha_1 \cdot \Delta t^2 \qquad \text{[Equation 4-1]}$$

$$\Delta\theta_1 = \omega_1 \cdot \Delta t + \frac{1}{2}\alpha_1 \cdot \Delta t^2 \qquad \text{[Equation 4-2]}$$

Wherein $\Delta t$ is the sampling period of first sensor 10 and second sensor 12 during the measurement (Step S56).

From the figure, it can be seen that theoretically, when rotational center O is between the first location A and the second location B, rotational angles (that is, $\Delta\theta_1$, $\Delta\theta_2$) of target object 2 measured at first location A and second location B should be equal. However, in practice, the deviation caused by noise or different environment factors might lead to different rotational angles measured at first location A and second location B.

Therefore, as shown in FIG. 1A, the rotation measuring module 1 of this preferred embodiment can further include low pass filter 16, which can, depending on the real situation, be disposed in between first sensor and/or second sensor 12 and processor 14, and depending on the actual need, the quantity of low pass filter 16 can be adjusted. Through the installation of low pass filter 16, the noise sensed by first sensor 10 and/or second sensor 12 can be filtered out so as to reduce the interference of processor 14 by noise and to calculate more accurate parameters and rotational angles. Of course, the rotation measuring module 1 of this invention can further includes other types of components (For example, nose inhibition component) to achieve the above mentioned objectives.

In addition, in practical application, in addition to the above mentioned noise filtering or inhibition components, the rotation measuring module 10 of this invention can perform data compensation through the following method:

First, first sensor 10, on at least two different time points, will sense at first location A the first previous data and the first next data, in the mean time, second sensor 12, on at least two different time points, will sense at second location B the second previous data and the second next data. Next, processor 14 will compare the first difference between the first previous data and the first next data, and it will also compare the second difference between the second previous data and the second next data. When the first difference value is larger than the default threshold value, processor 14 will follow the second difference value to adjust the first next data; on the contrary, when the second difference value is larger than the default threshold value, processor 14 will follow the first difference value to adjust the second next data.

In addition, in practical application, rotational center O will not necessarily be in between first location A and second location B. For example, please refer to FIG. 3 to FIG. 5, which illustrates respectively different rotational situations in target object 2.

Figure 3:
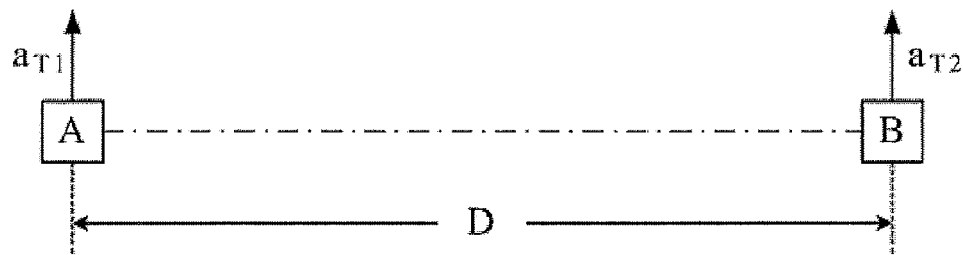
FIGS. 3 to 5 illustrates different rotational situations of target object.
Figure 4:
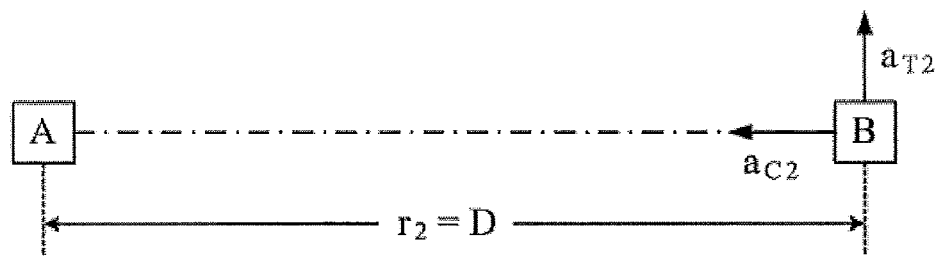
Figure 5:
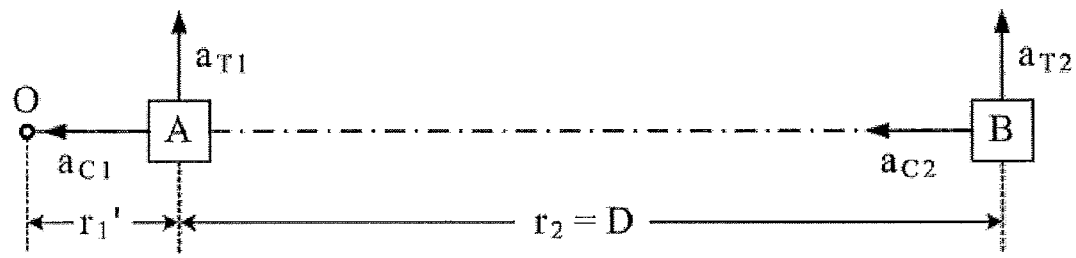

As shown in FIG. 3, target object 2 could be still and not rotational, at this moment, $a_{T1}=-a_{T2}$, and $\Delta\theta_1$ and $\Delta\theta_2$ are both 0. As shown in FIG. 4, rotational center O might be on first location A, at this moment, $a_{T1}=0$, and $r_2=D$; on the contrary, when the rotational center O is at second location B, $a_{T2}=0$, and $r_1=D$. Furthermore, as in FIG. 5, rotational center O might fall out of the line connecting first location A and second location B (closer to first location A), at this moment, $r_1'=|r_1|$, and $r_2=D+r_1$.

Therefore, in practical application, processor 14 can store in advance data related to the above mentioned special situation; meanwhile, when the receiving sensors 10, 12 measure some data, it will compare with the pre-stored data so as to reduce the calculation time. For example, when processor 14 receives both zero data of tangential acceleration ($a_{T1}$, $a_{T2}$) from sensors 10 and 12, we can judge that target object 2 is still and does not rotate. Furthermore, when 14 receives zero of first tangential acceleration ($a_{T1}$) as sent from first sensor 10, and not zero of second tangential acceleration ($a_{T2}$) from second sensor 12, we can judge that rotational center O is at first location A, hence, it is only necessary to follow the data sent from second sensor 12 to calculate rotational angle.

Theoretically, before the start of rotation or after the completion of rotation of target object 2, processor 14 will follow the data sent from sensors 10 and 12 to calculate, and the obtained rotational angles of target object 2 should all be zero. However, in practical application, even if target object 2 does not rotate, sensors 10 and 12 can still sense the change of centrifugal acceleration or tangential acceleration.

Therefore, in actual application, only when first centripetal acceleration and/or first tangential acceleration, and/or second centrifugal acceleration and/or second tangential acceleration is larger than default threshold value for preset time (For example, but not limited to, continuous 0.1 second) (it represents the start of rotation), processor 14 will calculate angular velocity, angular acceleration and rotational angle. But when first centripetal acceleration and/or first tangential acceleration, and/or second centrifugal acceleration and/or second tangential acceleration is smaller than default threshold value for preset time (For example, but not limited to, continuous 1 second)(it represents the stop of the rotation), processor 14 will not calculate. In practical application, processor 14 can still follow the obtained rotational angle of the target object 2 to output the control signal.

Figure 6:
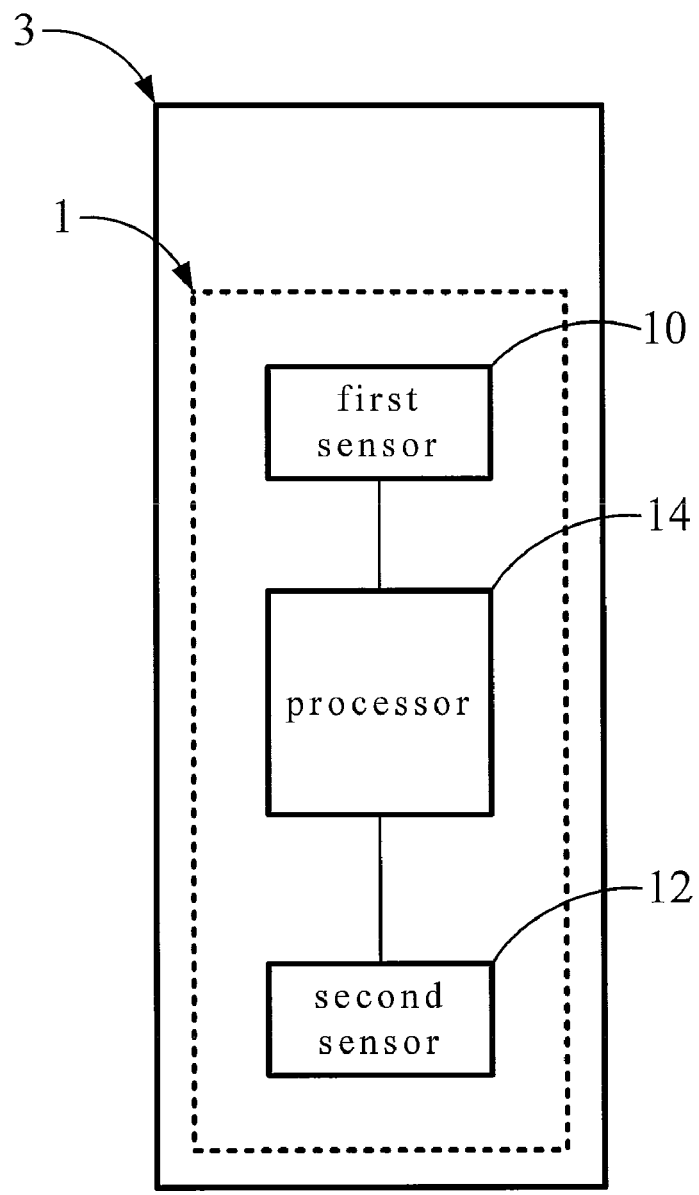
FIG. 6 illustrates the functional diagram of portable device of one preferred embodiment according to this invention.

For further step, please refer to FIG. 6. FIG. 6 illustrates the functional block diagram of a portable device 3 of one preferred embodiment according to this invention. As shown in the figure, portable device 3 can include the above mentioned rotation measuring module and the components such as first sensor 10, second sensor 12 and processor 14 within it so as to measure the rotation of portable device 3. In actual application, portable device 3 can further include other components of the above mentioned rotation measuring module 1. Of course, portable device 3 can also include other functional components, for example, screen, keys, network module, camera module and positioning module, etc. In addition, portable device 3 can execute program that needs to perform control through the rotational angle related data as measured by rotation measuring module 1, for example, but not limited to, game and multi-media playing program, etc. At this moment, processor 14 can further output rotational angle and other related data so as to control the operation of those programs. In real application, processor 14 can be integrated with the processing module of the portable device 3 itself or it can exist independently.

To sum up, in this invention, two sensors are used to measure respectively centrifugal acceleration and tangential acceleration of different locations of target object, hence, the rotation of target object in the horizontal direction can be measured. In addition, the data measured by two sensors, depending on the real situation, can compensate each other, and the error can be reduced. In addition, in this invention, through the use of two sensors, the objective of the measurement of rotation of target object in the horizontal direction can be achieved, hence, it can be integrated within portable device so that as compared to the prior art technology, it has advantages such as: small volume, low cost and low calculation complexity.

Although the present invention is disclosed through a better embodiment as above, yet it is not used to limit the present invention, anyone that is familiar with this art, without deviating the spirit and scope of the present invention, can make any kinds of change, revision and finishing; therefore, the protection scope of the present invention should be based on the scope as defined by the following attached "what is claimed".

What is claimed is:

1. A rotation measuring module used to measure rotation of a target object, the rotation measuring module comprising:
   a first sensor, installed at one first location of the target object so that when the target object is rotating, the first sensor senses a first centripetal acceleration and a first tangential acceleration;
   a second sensor, installed at a second location of the target object so that when target object is rotating, the second sensor senses a second centrifugal acceleration and a second tangential acceleration; and a processor, which is connected respectively to the first sensor and the second sensor so as to receive from the first sensor the first centripetal acceleration ($a_C$) and the first tangential acceleration ($a_T$), and to receive from the second sensor the second centrifugal acceleration and the second tangential acceleration; meanwhile, the processor follows the following equation 1 and 2 to calculate respectively an angular velocity ($\omega$) and an angular acceleration ($\alpha$) of the first location and the second location:

$$\omega = \sqrt{\frac{a_C}{r}} \quad \text{[Equation 1]}$$

$$\alpha = \frac{a_T}{r} \quad \text{[Equation 2]}$$

wherein, r is respectively a distance from the first location and the second location to the rotational center of the target object, next, the processor will follow the following equation 3 to calculate a rotational angle ($\Delta\theta$) of the target object:

$$\Delta\theta = \omega \cdot \Delta t + \frac{1}{2}\alpha \cdot \Delta t^2 \quad \text{[Equation 3]}$$

wherein $\Delta t$ is a sampling period of the first sensor and the second sensor during the measurement.

2. The rotation measuring module of claim 1, wherein the processor will follow respectively the following equation 4 and 5 to calculate the distance ($r_1$) between the first location and the rotational center of the target object and the distance ($r_2$) between the second location and the rotational center of the target object:

$$r_1 = \frac{D \cdot a_{T1}}{a_{T1} + a_{T2}} \quad \text{[Equation 4]}$$

$$r_2 = \frac{D \cdot a_{T2}}{a_{T1} + a_{T2}} \quad \text{[Equation 5]}$$

wherein $a_{T1}$ is a first tangential acceleration, $a_{T2}$ is a second tangential acceleration, and D is a distance between the first location and the second location.

3. The rotation measuring module of claim 1, further comprising at least one low pass filter disposed respectively among the first sensor and the second sensor and the processor.

4. The rotation measuring module of claim 1, wherein the first sensor, on at least two different time points and at the first location, will sense a first previous data and a next data, and the second sensor, on the at least two different time points and at the second location, will sense a second previous data and a second next data, and the processor will then compare a first difference value between the first previous data and the first next data, and then compare a second difference value between the second previous data and the second next data; wherein when the first difference value is larger than one preset threshold value, the processor will then follow the second difference value to adjust the first next data, or when the second difference value is larger than the preset threshold value, the processor will then follow the first difference value to adjust the second next data.

5. The rotation measuring module of claim 1, wherein only when the first centripetal acceleration and/or the first tangential acceleration, and the second centrifugal acceleration and/or the second tangential acceleration is larger than the preset threshold value for a preset time, processor will then calculate the angular velocity, the angular acceleration and the rotational angle.

6. The rotation measuring module of claim 1, wherein the processor will follow the rotational angle to output a control signal.

7. A portable device comprising the rotation measuring module of claim 1, which is used to measure the rotation of the portable device.

8. The portable device of claim 7, wherein the processor will follow the rotational angle to output a control signal.

9. A rotation measuring method, which is applicable to measurement of rotation of a target object, and the rotation measuring method comprising the following steps:

(a) when the target object is rotating, sensing at one first location of the target object, a first centripetal acceleration and a first tangential acceleration by a first sensor, and sensing at the second location of the target object, a second centrifugal acceleration and a second tangential acceleration by a second sensor;

(b) receiving the first centripetal acceleration ($a_c$) and the first tangential acceleration ($a_T$), and the second centrifugal acceleration and the second tangential acceleration respectively by a processor;

(c) according to the following equation 1 and 2, calculating an angular velocity ($\omega$) and an angular acceleration ($\alpha$) of the first location and the second location respectively by the processor:

$$\omega = \sqrt{\frac{a_C}{r}} \quad \text{[Equation 1]}$$

$$\alpha = \frac{a_T}{r} \quad \text{[Equation 2]}$$

wherein, r is respectively a distance from the first location and the second location to the rotational center of the target object; and (d) according to the following equation 3, calculating one rotational angle ($\Delta\theta$) of the target object by the processor:

$$\Delta\theta = \omega \cdot \Delta t + \frac{1}{2}\alpha \cdot \Delta t^2 \quad \text{[Equation 3]}$$

wherein $\Delta t$ is a sampling period of the first sensor and the second sensor during the measurement.

10. The rotation measuring method of claim 9, further comprising the following steps:

(e) the following equation 4 and 5 are based respectively to calculate the distance ($r_1$) between first location and the rotational center of the target object and the distance ($r_2$) between the second location and the rotational center of the target object:

$$r_1 = \frac{D \cdot a_{T1}}{a_{T1} + a_{T2}} \quad \text{[Equation 4]}$$

$$r_2 = \frac{D \cdot a_{T2}}{a_{T1} + a_{T2}} \quad \text{[Equation 5]}$$

wherein $a_{T1}$ is a first tangential acceleration, $a_{T2}$ is a second tangential acceleration, and D is a distance between the first location and the second location.

11. The rotation measuring method of claim 9, further comprising the following steps:
   (f) on at least two different time points and at the first location, first previous data and first next data is sensed, and a first difference value between the first previous data and the first next data is compared;
   (g) on at least two different time points and at the second location, a second previous data and a second next data is sensed, and a second difference value is compared between the second previous data and the second next data; and
   (h) when the first difference value is larger than a preset threshold value, the second difference value is based to adjust the first next data, or when the second difference value is larger than the preset threshold value, the first difference value is based to adjust the second next data.

12. The rotation measuring method of claim 9, wherein when the first centripetal acceleration and/or the first tangential acceleration, and the second centrifugal acceleration and/or the second tangential acceleration is larger than the preset threshold value for a preset time, steps (c) and (d) will be performed.

* * * * *